United States Patent
El Hajj et al.

(10) Patent No.: US 11,086,660 B2
(45) Date of Patent: Aug. 10, 2021

(54) SERVER VIRTUAL ADDRESS SPACE

(71) Applicant: Hewlett Packard Enterprise Development LP, Houston, TX (US)

(72) Inventors: Izzat El Hajj, Urbana, IL (US); Alexander Merritt, Palo Alto, CA (US); Gerd Zellweger, Palo Alto, CA (US); Dejan S Milojicic, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 204 days.

(21) Appl. No.: 16/083,284

(22) PCT Filed: Mar. 9, 2016

(86) PCT No.: PCT/US2016/021446
§ 371 (c)(1),
(2) Date: Sep. 7, 2018

(87) PCT Pub. No.: WO2017/155523
PCT Pub. Date: Sep. 14, 2017

(65) Prior Publication Data
US 2019/0095242 A1    Mar. 28, 2019

(51) Int. Cl.
*G06F 9/48*        (2006.01)
*G06F 12/10*       (2016.01)
(Continued)

(52) U.S. Cl.
CPC ............ *G06F 9/4843* (2013.01); *G06F 12/02* (2013.01); *G06F 12/08* (2013.01); *G06F 12/10* (2013.01); *G06F 2212/657* (2013.01)

(58) Field of Classification Search
None
See application file for complete search history.

(56) References Cited

U.S. PATENT DOCUMENTS 6,108,715 A      8/2000   Leach et al.
6,119,214 A *    9/2000   Dirks ...................... G06F 12/10
                                                        711/159
(Continued)

FOREIGN PATENT DOCUMENTS

WO    WO-2015156830 A1    10/2015
WO    WO-2017044124 A1    3/2017

OTHER PUBLICATIONS

Hajj et al.; "SpaceJMP: Programming with Multiple Virtual Address Spaces" ACM, Apr. 6, 2016 (Hajj_2016.pdf; pp. 1-16) (Year: 2016).*

(Continued)

*Primary Examiner* — Hiren P Patel
(74) *Attorney, Agent, or Firm* — Sheppard Mullin Richter & Hampton LLP (57) ABSTRACT

Techniques for a thread in client process to switch to a server virtual address space are provided. In one aspect, a process may attach to a server virtual address space. A request may be received from a client thread within the client process to switch from a virtual address space associated with the client thread to a server virtual address space. The client thread may switch from the client thread associated virtual address space to the server virtual address space.

18 Claims, 10 Drawing Sheets

(51) Int. Cl.
  *G06F 12/02* (2006.01)
  *G06F 12/08* (2016.01)

(56) References Cited

U.S. PATENT DOCUMENTS

| | | | | |
|---|---|---|---|---|
| 6,158,045 | A | 12/2000 | You | |
| 6,175,916 | B1* | 1/2001 | Ginsberg | G06F 9/4484 712/228 |
| 6,349,355 | B1* | 2/2002 | Draves | G06F 9/4843 711/6 |
| 10,754,792 | B2* | 8/2020 | El Hajj | G06F 12/109 |
| 2003/0088752 | A1* | 5/2003 | Harman | G06F 12/08 711/202 |
| 2003/0110205 | A1* | 6/2003 | Johnson | G06F 12/109 718/104 |
| 2004/0162952 | A1* | 8/2004 | Feind | G06F 12/1036 711/147 |
| 2005/0193169 | A1* | 9/2005 | Ahluwalia | G06F 12/1009 711/115 |
| 2005/0273570 | A1 | 12/2005 | Desouter et al. | |
| 2006/0085588 | A1* | 4/2006 | Rajwar | G06F 12/08 711/100 |
| 2006/0168214 | A1* | 7/2006 | Armstrong | G06F 9/4881 709/225 |
| 2007/0067771 | A1* | 3/2007 | Kulbak | G06F 9/4843 718/100 |
| 2007/0156973 | A1* | 7/2007 | Fleischer | G06F 12/109 711/147 |
| 2007/0294496 | A1* | 12/2007 | Goss | G06F 9/461 711/163 |
| 2008/0140971 | A1* | 6/2008 | Dankel | G06F 12/1036 711/163 |
| 2009/0024798 | A1* | 1/2009 | Lyndem | G06F 16/10 711/129 |
| 2009/0094430 | A1* | 4/2009 | Bergheaud | G06F 9/526 711/163 |
| 2010/0083275 | A1* | 4/2010 | Jayamohan | G06F 9/461 718/108 |
| 2010/0250866 | A1 | 9/2010 | Kojima et al. | |
| 2010/0333096 | A1* | 12/2010 | Dice | G06F 9/467 718/102 |
| 2011/0258608 | A1* | 10/2011 | Li | G06F 11/3644 717/127 |
| 2012/0072669 | A1* | 3/2012 | Nishiguchi | G06F 12/1027 711/135 |
| 2012/0117353 | A1 | 5/2012 | Armstrong et al. | |
| 2013/0024645 | A1 | 1/2013 | Cheriton et al. | |
| 2013/0054789 | A1 | 2/2013 | Bajamahal | |
| 2014/0359629 | A1* | 12/2014 | Ronen | G06F 9/461 718/102 |
| 2015/0013008 | A1* | 1/2015 | Lukacs | G06F 21/566 726/24 |
| 2015/0220354 | A1* | 8/2015 | Nair | G06F 9/45533 710/301 |
| 2017/0249178 | A1* | 8/2017 | Tsirkin | G06F 9/45558 |
| 2018/0121122 | A1* | 5/2018 | Awad | G06F 13/16 |
| 2018/0322067 | A1* | 11/2018 | Hajj | G06F 12/109 |

OTHER PUBLICATIONS

Bershad et al., "User-Level Interprocess Communication for Shared Memory Multiprocessors", ACM Transactions on Computer Systems, vol. 9, No. 2, May 1991, pp. 175-198.

Chase et al., "Sharing and Protection in a Single Address Space Operating System", 1994, 36 pages.

Faraboschi et al., "Beyond Processor-centric Operating Systems", HotOS, May 18-20, 2015, 7 pages.

Heiser et al., The Mungi: Single-Address-Space Operating System, Jul. 25, 1998, pp. 1-33.

Kai Li, "IVY: a Shared Virtual Memory System for Parallel Computing", ICPP, 1988, pp. 94-101.

Takahashi et al., "Efficient Kernel Support of Fine-Grained Protection Domains for Mobile Code", Proceedings—19th IEEE International Conference on Distributed Computing Systems, 1999, pp. 64-73.

Goundadkar R. et al., Minimizing Communication Overhead of Server in Client Server Communication, (Research Paper), 2015, vol. 6(2), 4 Pages.

International Searching Authority, The International Search Report and the Written Opinion, PCT/US2016/021446, dated Jan. 23, 2017, 13 Pages.

Liedtke J., Improved Address-space Switching on Pentium Processors by Transparently Multiplexing User Address Spaces, (Research Paper), Nov. 1995, 17 Pages.

* cited by examiner

SERVER VIRTUAL ADDRESS SPACE

BACKGROUND

The majority of modern computing systems include a virtual memory system. In a virtual memory system computing device, each process is provided a virtual address space (VAS) that spans the entire address space addressable by the architecture of the processor (e.g. a 32 bit processor has a 4 Gigabyte address space), although not all of that address space may be directly accessible by the process due to other constraints. For example, certain address ranges within the VAS may be reserved for system functions (e.g. kernel space). In some cases, the virtual memory system may not implement the maximum address space supported by the processor (e.g. the virtual memory system may only support 30 address bits, limiting the VAS to 1 Gigabyte).

The address space for each process is virtual because the computing system may not actually include enough physical memory for every processes' address space to be loaded into physical memory at the same time. The virtual memory system hides the fact that each processes' address space may not actually be loaded into the physical memory of the computing system by transparently swapping pages of each processes' address space between physical memory and some other storage (e.g. a swap file on disk).

DETAILED DESCRIPTION

As mentioned above, computing devices employing a virtual memory system may allow a process to include a VAS that exceeds the amount of physical memory in the device. However, systems are currently being developed with large amounts of physical memory. In some case, the amount of physical memory may exceed that which is available in the VAS. As a simple example, a system supporting a 32 bit VAS defines the maximum address range as 4 Gigabytes. Physical memory exceeding 4 Gigabytes would not be addressable at any given moment in time by a process running on a computing device with such a VAS, regardless of how much physical memory was actually installed in the device.

The techniques described herein overcome this shortcoming by treating a VAS as a first class entity, thus decoupling the VAS from a given process. A VAS may be created, stored, and deleted in the same way as any other first class entity, such as a file. A process may include data (e.g. a pointer) indicating the process's current VAS. The data may then be changed to indicate a different current VAS. Because the process is now associated with a different VAS, the effective address space has doubled. If additional virtual memory is needed, additional virtual address spaces may be created.

Furthermore, by treating a VAS as a first class entity, new types of memory sharing may be made possible. For example, a first and second process may each have a VAS. The first process may switch to the second process's VAS (or at least portions of the VAS) and thus will have access to the second process' VAS without requiring the complexity that accompanies memory segments shared between processes. For example, there would no longer be a need to manage virtual address conflicts between the first and second VAS. Instead, one process could simply switch to the other process's VAS, thus eliminating conflicts that may arise when mapping physical memory into two separate virtual address spaces. When a reference to a process' or threads' VAS or the VAS associated with a process or thread is made, this means the VAS currently being used by the process or thread at that moment in time (e.g. the VAS currently pointed to by the process/threads page table pointer). However, it should be understood that a VAS may also exist that is not currently in use by any process or thread. In addition, references to a process or thread switching into a VAS means that a different VAS is attached to the process and threads of that process can switch into the VAS.

In addition, because each VAS is a first class entity that may exist independently of a process, new mechanisms for accessing data resident in system memory may become available. For example, a VAS may be created to contain a dataset, and that VAS may not be in use by any process. When a thread of a process needs access to that dataset, the thread may switch to the VAS associated with the dataset. Once the process or thread no longer needs to access the data set, it may switch back to its original VAS.

The ability of a thread to switch from one VAS to another provides for new accelerated client-server programming models. In many cases where concurrent data access is needed (e.g. databases, key-value stores, webservers, etc.), a client-server model may be employed. A server can enforce access protection on the data and ensure consistency if the data is updated and read concurrently by many clients.

However, the benefits provided by the client server model do not come without a cost. For example, clients typically need to communicate with a server via some type of inter-process or network communication (e.g. remote procedure calls, sockets, etc.), which adds overhead. For example, data may need to be serialized and de-serialized to make use of the inter-process communication mechanisms. In addition, if large numbers of clients need to be serviced, multiple instances of the server may be run. However, this entails additional overhead for synchronization between the different server instances.

The techniques described herein utilize VAS switching in order to eliminate some of the downsides of the inter-process communication based client server models. A server VAS containing the code and data associated with a server may be created and initialized. In some implementations, the server VAS may exist as a standalone VAS. In other implementations, a server process may be associated with the server VAS.

When a client process, or more specifically a client thread within a client processes wishes to access data or execute functionality that would be associated with a server, instead of using the inter-process communications model, the client thread would instead switch out of its own VAS and switch into the VAS of the server. The process may include the client process first attaching to the VAS of the server. Attaching to the VAS may include actions that allow client threads to switch seamlessly into the server virtual address space, and then switch back into their own VAS. For example, the actions may include copying portions of the thread's context, such as the thread's stack and local variables, as well as executable code, into the server virtual address space. Each thread may contain an instance of a page table pointer, which, as will be describe below, defines the VAS that a thread is currently using.

The client thread would then access the data and the functionality of the server, without incurring any of the overhead associated with inter-process communication, while at the same time enforcing access protection on the data and ensuring consistency. For example, the server VAS may provide for different levels of access based on the client thread that is switching into the server VAS. The server VAS may have properties associated with it that control how, how many, and when client threads are allowed to switch into the server VAS. The properties may also determine the privileges the client thread has within the VAS (e.g. read only access, read-write access, etc.).

Figure 1:
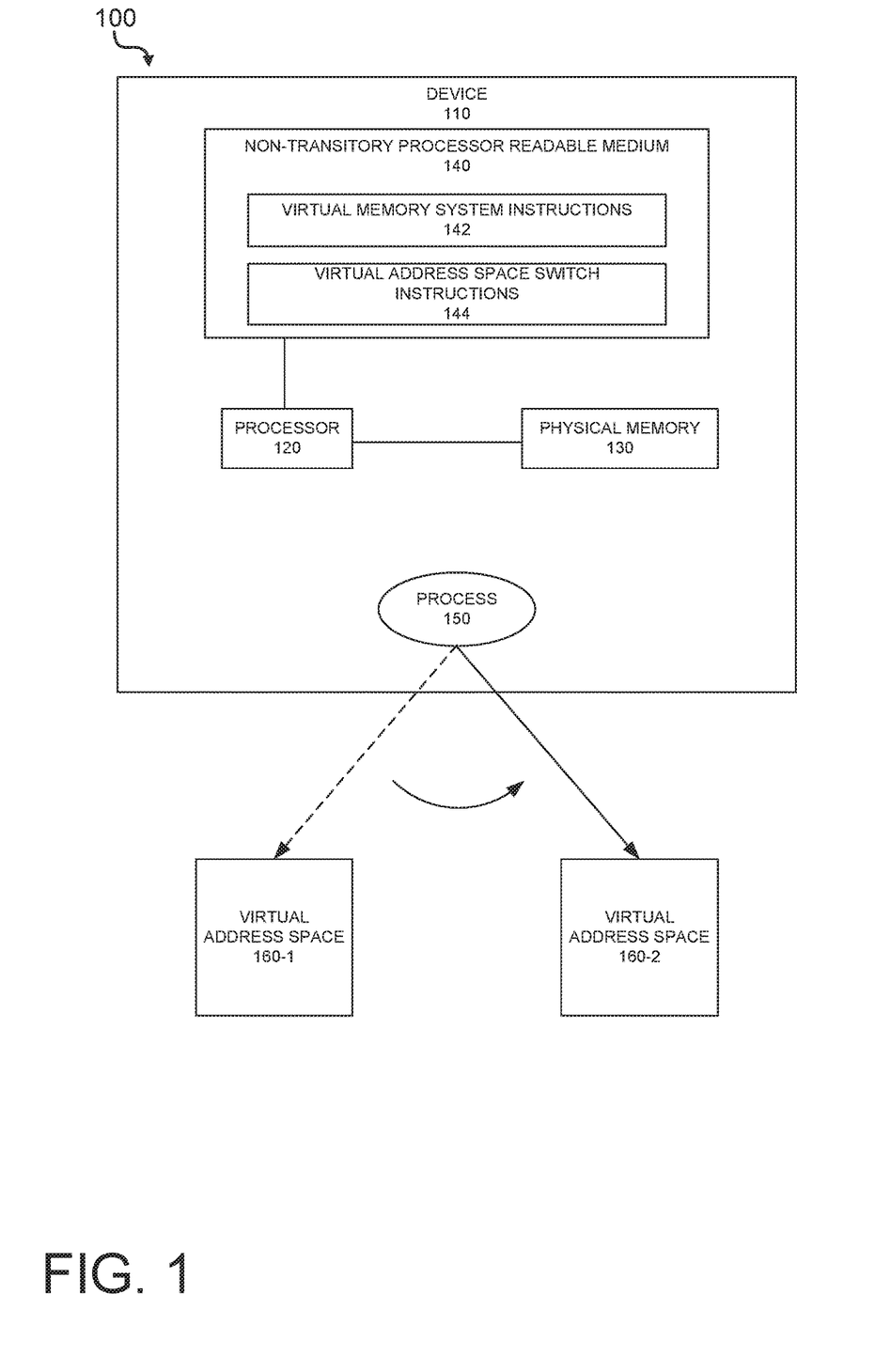
FIG. 1 is an example of a device that may utilize the process virtual address space switch techniques described herein.

FIG. 1 is an example of a device that may utilize the process virtual address space switching techniques described herein. System 100 may include a device 110. The device 110 may include a processor 120, a physical memory 130, and a non-transitory processor readable medium 140. The device 110 may be a computing device, such as a server computer, a desktop computer, a laptop, a tablet, a smartphone, or any other suitable device. The techniques described herein are not limited to any particular device and are usable in any device that includes a virtual memory system.

The device 110 may include a processor 120. The processor may be of any type, such as a central processing unit (CPU), graphics processing unit (GPU), and application specific integrated circuit (ASIC), or any other suitable type of circuitry or device. The techniques described herein are not limited to any particular type of processor, but rather are applicable to any processor that may be utilized in a device that implements a virtual memory system.

The device 110 may also include a physical memory 130. The physical memory may include dynamic random access memory (DRAM), static random access memory (SRAM), non-volatile random access memory (NVRAM), such as memristor or phase change memory, or any other suitable form of memory. The memory may be used to store processor executable instructions and data. The techniques described herein are suitable for use with any type of memory that may be utilized by the processor 120.

The device 110 may also include a non-transitory processor readable medium 140. The medium may contain thereon a set of instructions, which when executed by the processor 120, may cause the processor to implement the techniques described herein. For example, the medium may include virtual memory system instructions 142. As mentioned previously, a virtual memory system may be used to abstract the physical memory of a device 110 from processes running on that device. Each process is provided an address space sized according to the constraints of the virtual memory system. Each process utilizes this address space and need not be aware of the actual physical memory 130 that is included in the device.

The medium 140 may also include virtual address space switch instructions 144. The virtual address space switch instructions may allow the processor to switch a process's VAS from a first VAS to a second VAS, thus effectively increasing the amount of memory the process may access beyond the range defined by a single VAS. In some example implementations, the first virtual address space may be associated with a client process. The second virtual address space may be associated with a server or server process. Switching from the client virtual address space may allow the client to access data and functionality that is only available in the server virtual address space. The virtual address space switch instructions are described in more detail below.

In operation, a process 150 may be executing on device 110. As is explained in more detail below, a process may be instructions and data that are executable by a processor to complete a task. For example, a database program running on the device 110 may be comprised of one or more processes. A process runs under the control of an operating system and may have process state information. Included amongst the process state information may be data that defines the VAS of the process. Although the description refers to operating systems, it should be understood that an operating system is any control software, including hypervisors and other supervisory software. Likewise, a process refers to anything that exists within a virtual address space, including virtual machines.

A process 150 may initially be associated with a first VAS 160-1. As mentioned above a VAS is used by the virtual memory system to make it appear to the process that the full address space of the device 110 is available to the process, even though the device may not be equipped with enough physical memory for the process's entire VAS to be loaded into physical memory.

A process may desire to access a different VAS. For example, the process may need more memory than is available in the VAS. In other cases, the process may wish to access data that is contained in the VAS of a different process. Regardless of the reason, the process may wish to switch from the first VAS 160-1 to a second VAS 160-2. The techniques provided herein provide instructions executable by the processor to cause a process to switch from a first VAS 160-1 to a second VAS 160-2.

Figure 2:
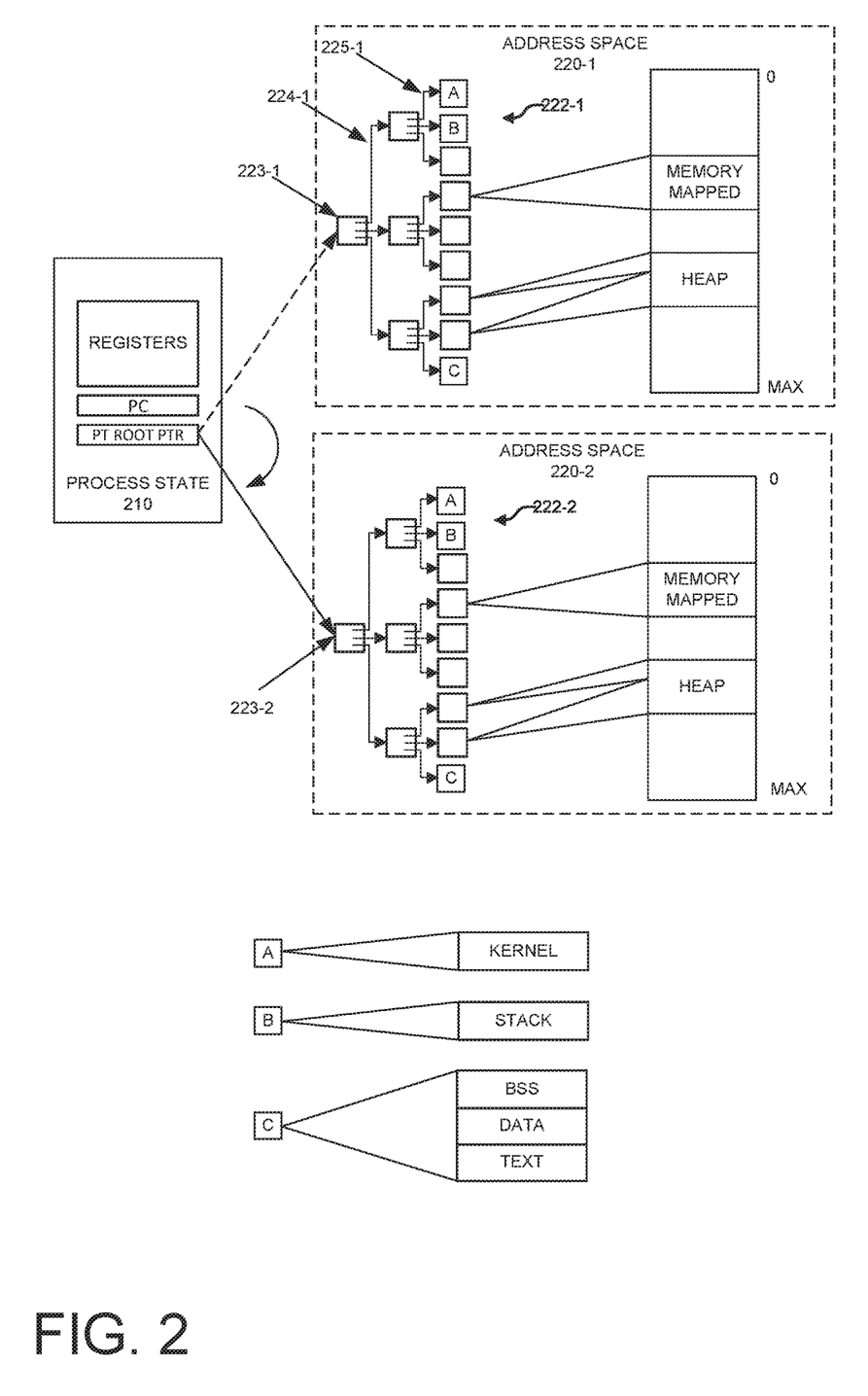
FIG. 2 depicts an example of switching a virtual address space according to the techniques described herein.

FIG. 2 depicts an example of switching a virtual address space according to the techniques described herein. In one example implementation, each process running on device 110 may include process state information 210. The process state information may include the contents of registers contained within the processor. In a multiprocessing system, multiple processes may run on the same processor. When a particular process is not actively running, processor state information, such as the processor register contents may be saved.

In addition, the process state information may include a program counter (PC) which may indicate the current instruction being executed within the process. Thus, when a context switch occurs, and a process that was not previously being executed begins execution, the PC may be used to tell the processor where to resume execution.

Another piece of process state may include a pointer to the page table root for the process (PT ROOT PTR). In many systems including a virtual memory system, page table structures are what is used to define a VAS. In order to better understand the techniques described herein, a review of one implementation of a virtual memory system may prove useful.

A system including a virtual memory system may include a VAS with a defined address range. As mentioned above, the range may be from 0 to the maximum supported by the virtual memory system. As shown in FIG. 2, VAS 220 has an address range from 0-MAX. It should be understood that the particular value of MAX is unimportant. The VAS may be broken down into smaller units called pages. For example, one common page size is 4 Kilobytes. Thus, a 4 Gigabyte VAS may be divided into slightly more than 1 million pages.

Each page of the VAS may be represented by a page table entry, and those combinations of the page table entries for the entire VAS may be referred to as a page table structure. FIG. 2 depicts a high level view of a page table structure 222-1. The page table structure is depicted as containing a root node 223-1, intermediate nodes 224-1, and leaf nodes 225-1. The leaf nodes may include the actual page table entries. It should be understood that the particular format of the page table structure is unimportant, but rather that the page table structure may have a root node from which all page table entries descend.

Each page table entry may include at least two pieces of information. The first piece of information may be if the page is currently mapped to physical memory. As mentioned above, a virtual memory system hides the fact that all of a process's VAS may not be contained in physical memory from the process. If the page is not in physical memory, the page may be stored in some other storage area (e.g. disk).

The second piece of information may be the address in physical memory storing the page (assuming the first piece of information indicates the page is stored in physical memory). It should be understood that because the physical memory may not necessarily be as large as the VAS, the virtual address will likely not be equivalent to the physical address. Furthermore, because a multiprocessing system executes several processes, each process cannot simultaneously use the same physical memory, thus generally precluding virtual addresses from matching physical addresses.

In general, a process may wish to execute instructions or access data located at a specific virtual address. The virtual memory system may receive the virtual address and access the page table structure pointed to by the process state information (e.g. the PT ROOT PTR). The virtual memory system may traverse the structure to find the page table entry associated with the memory page containing the virtual address of interest. If the page is currently loaded into physical memory, the virtual memory system may return the address within the physical memory where the page is stored and the process may access the page in the physical memory. If the page is not currently in physical memory, a page fault occurs and control may be handed to the operating system. The operating system may then load the page from storage (e.g. disk) into the physical memory (this process may involve clearing space for the page in the physical memory by selecting a page to evict from physical memory and store to disk). Once the page has been loaded into physical memory, the process can access the address.

In the above explanation, it should be understood that the VAS may be defined by the page table structure. In previous systems, the page table structure was strictly associated with a process. By making the page table structure a first class entity, the structure is no longer tied to a given process, and the corollary is true as well; the process is no longer tied to a given page table structure. Thus, in the current example, in order to associate a given process with a new VAS, the pointer to the page table root structure in the process state information 210 may be switched from the initial VAS to the new VAS.

It should be understood that additional steps may be executed in order to perform the switch. For example, the processor may include data associated with the first VAS in registers or in various levels of on processor caches. This data may need to be flushed to memory before switching from one VAS to another.

In operation, a process may wish to switch from a first VAS 220-1 to a second VAS 220-2. The process may first prepare for the switch by flushing processor registers and caches to the memory, as needed, to ensure that data associated with the first VAS is not inadvertently stored in the second VAS should a flush occur after the switch of the VAS. The processor may then update the page table root pointer of the process state information to point from the page table root 223-1 to page table root 223-2. As such, the VAS of the process then switches from VAS 220-1 to VAS 220-2. As each VAS is independent, the process has effectively increased the total size of its virtual address space. Furthermore, as a VAS can exist independent of a process, the process gains access to the data that had been stored in that VAS prior to the process switching into that VAS.

Although the previous example has been described in terms of switching the page table root pointer, it should be understood that this is not the only possible implementation. For example, in an alternative implementation, rather than switching to a new page table structure as identified by the page table root pointer, the contents of the page table structure (e.g. 222-1) may first be stored elsewhere (e.g. to disk, or in the address space of a different process, such as the operating system kernel). The contents of the page table structure 222-1 may then be overwritten with the contents of a different page table structure, thus effectively changing the page table structure 222-1 without changing the page table root pointer.

In other example implementations, page tables may not be used at all. Such systems may use segment registers and offset computations to define virtual address spaces. However, it should be understood that the techniques for switching virtual address spaces are suitable for use regardless of the type of virtual memory system. What should be understood is that a VAS is treated as a first class entity and can be associated with and/or disassociated from a process.

It should be further understood that although virtual address spaces are independent entities, this does not mean that portions of the VAS cannot be shared or duplicated between virtual address spaces. For example, a VAS may contain several portions that are effectively defined by the process. For example, the BSS, data, and text portions of a process generally define the instructions and variables that are executed by the processor and are the functional code portions of the process. In addition, a portion of the VAS may be set aside for the kernel portion of the operating system (e.g. allowing the process to make system calls). Furthermore, an additional portion of the VAS may be set aside for the stack. The stack is a data structure used by the process to store temporary variables and return pointers, among other data. The VAS may also include portions such as the heap, from which the process may allocate new memory within the virtual address space. The VAS may also include memory mapped portions.

In some case, it may be desirable to switch from one VAS to a second VAS, yet still maintain the portions of the original VAS. For example, it may be desirable to maintain the kernel, stack, BSS, data, and text portions between the first and second VAS. In one example implementation, the portions of the VAS that are to be shared may simply be copied, in their entirety, from one VAS to the other.

In another example implementation, rather than duplicating the desired portions of the VAS, the references to the portions may be duplicated. For example, assume the page table entries denoted by the reference characters A, B, and C represent the kernel, stack, and BSS, data, and text page table entries. As shown in page table structure 222-1, 222-2 those page table entries (A, B, and C) can simply be duplicated for each page. Because the page table entries are associated with memory (either in physical memory or in storage), the second VAS 220-2 contains the same kernel, stack, and BSS, data, and text portions, without having to actually copy those portions.

It should be understood that the operating system or processor may provide an API or a new processor instruction to ensure the switch from the first VAS to the second VAS is safe. For example, the process may invoke a system call to inform the operating system to inform the operating system of the switch in VAS. The operating system may then alter process state information in order to accurately track the VAS that is currently active for the process. In another example implementation, the processor may provide a special instruction to execute the switch. The processor may be provided an identifier associated with the second VAS, and the processor would perform the switch in the page table root pointer automatically, after state information is provided by the operating system.

Figure 3:
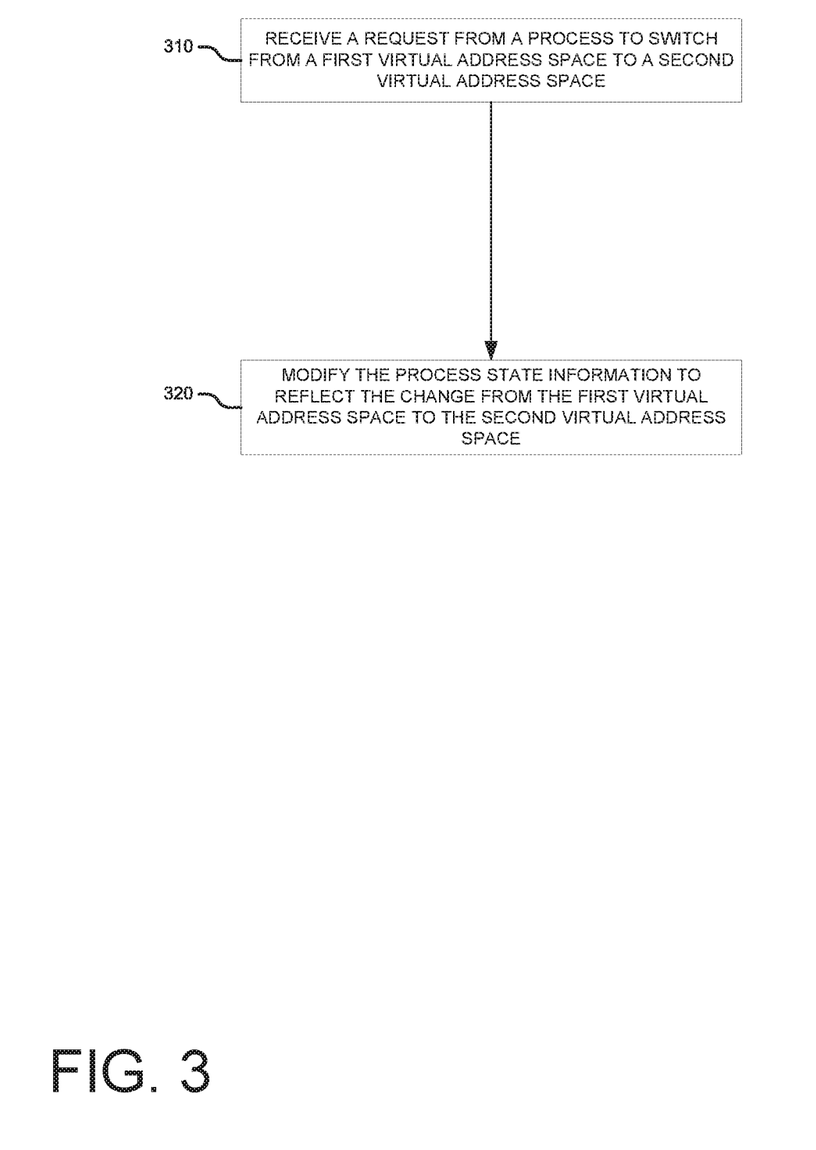
FIG. 3 is an example of a high level flow diagram for switching virtual address spaces, according to techniques described herein.

FIG. 3 is an example of a high level flow diagram for switching virtual address spaces, according to techniques described herein. The example flow diagram of FIG. 3 may be implemented as instructions contained on a non-transitory medium, such as instructions 144. In block 310, a request may be received from a process to switch from a first virtual address space to a second virtual address space. As explained above, the switch may be requested because the process needs access to more memory than can be addressed in a single VAS, or it may be for other reasons, such as a desire to access data contained in a VAS that is different than the one currently associated with the process.

In block 320, the process state information may be modified to reflect the change from the first virtual address space to the second virtual address space. In some implementations, the switch may be implemented by changing the page table root pointer for the process from a page table associated with the first virtual address space to a page table associated with the second virtual address space. Other implementations are described in further detail below, with respect to FIG. 4.

Figure 4:
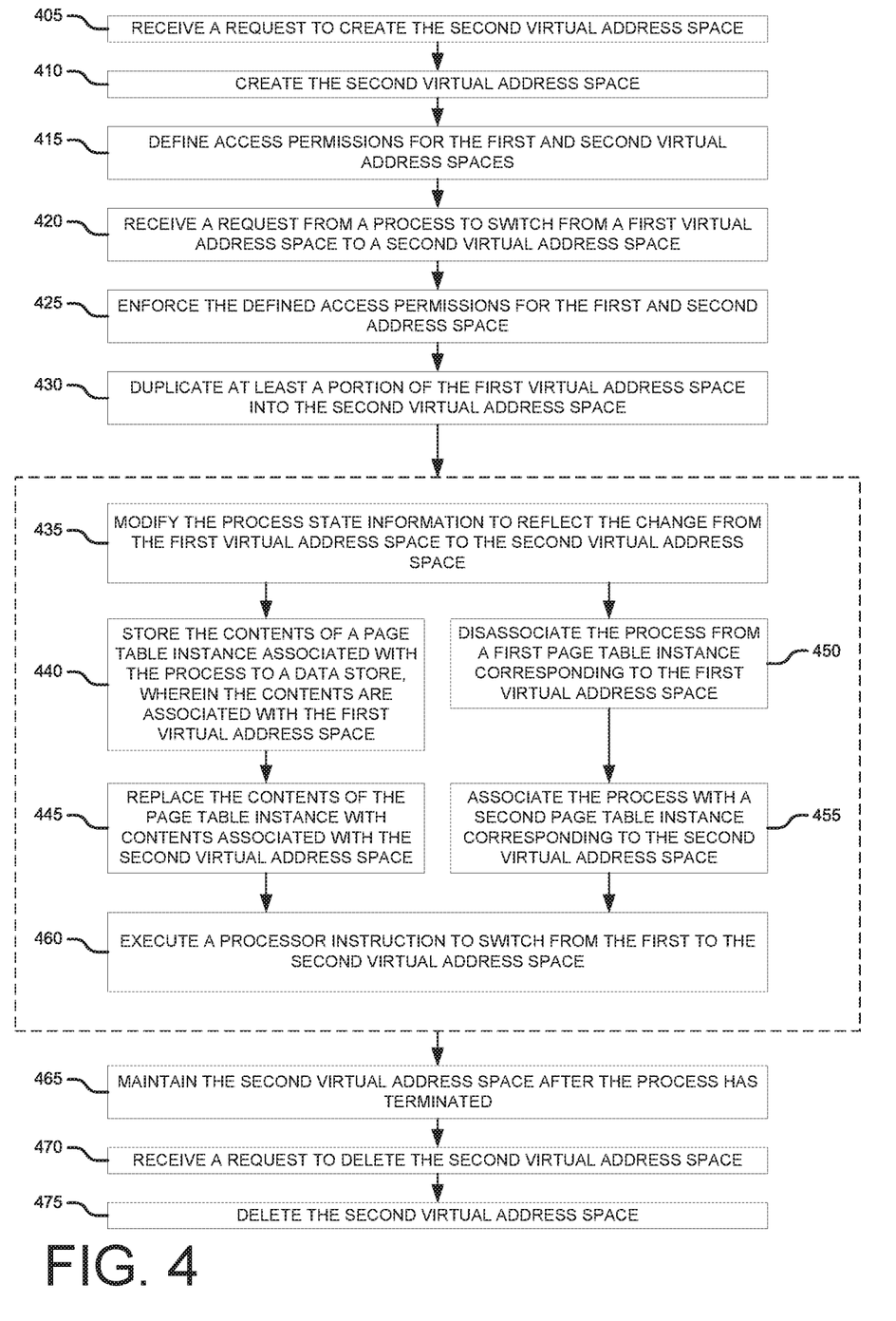
FIG. 4 is another example of a high level flow diagram for switching virtual address spaces, according to techniques described herein.

FIG. 4 is another example of a high level flow diagram for switching virtual address spaces, according to techniques described herein. The example flow diagram of FIG. 4 may be implemented as instructions contained on a non-transitory medium, such as instructions 144. In block 405, a request to create the second virtual address space may be received. As mentioned above, a VAS is now a first class entity and may be created independently of a process. In block 410, the second virtual address space may be created.

In some implementations, creating a VAS may include creating a new page table structure to associate with the new VAS. In other example implementations, creation of a new VAS may include creating the contents of a page table structure.

In block 415, access permissions for the first and second virtual address spaces may be defined. For example, read and write permissions for a virtual address may be defined and a given process's ability to access the VAS may depend on those permissions. For example, in one example implementation, it may be desired that a VAS is only writeable by one process at a time. As another example, a VAS may only be able to be deleted when no other process is using the VAS.

In block 420, a request may be received from a process to switch from a first virtual address space to a second virtual address space. In block 425, the defined access permissions for the first and second virtual address space may be enforced. For example, if a given VAS should not be accessed by a given process based on the permission defined in block 415, the request to switch the process into the prohibited VAS may be denied in order to enforce the permissions.

In block 430, at least a portion of the first virtual address space may be duplicated into the second virtual address space. As mentioned above, the duplication may be an actual copy of the address spaces from one space to another or it may be a copy of the page table entries associated with that portion of the address space. Regardless of implementation, the duplication of the address space may allow the process to continue executing without interruption.

Blocks 435-460 represent possible actions performed when switching from one virtual address space to another. Not all blocks need be executed by all implementations and the depiction is intended to be an example. Other possible implementations may execute different blocks. What should be understood is that the process switches from a first VAS to a second VAS.

In block 435, the process state information may be modified to reflect the change from the first virtual address space to the second virtual address space. In one example implementation, the process moves to block 440. In block 440, the contents of a page table instance associated with the process may be stored to a data store. The contents may be associated with the first virtual address space. In block 445, the contents of the page table instance may be replaced with contents associated with the second virtual address space. A page table instance may be data structure corresponding to the page table structure described with respect to FIG. 2.

In a different example implementation, in block 450, the process may be disassociated from a first page table instance corresponding to the first virtual address space. In block 455, the process may be associated with a second page table instance corresponding to the second virtual address space.

In block 460, a processor instruction may be executed to switch from the first to the second virtual address space. In some implementations, the instruction may be a part of the processor instruction set. In other implementations, the instruction may result from the process making a system call. Regardless of the implementation, the switch from one VAS to the other may include flushing processor caches and updating process state information.

In block 465, the second virtual address space may be maintained after the process has terminated. As mentioned above, a VAS is now a first class entity, meaning that it may exist separate from any process. Thus, a VAS may continue to exist even if it is no longer associated with a process.

In block 470, a request to delete the second VAS may be received. Again, because the VAS is a first class entity, it may be deleted just as any other first class entity may be deleted. In block 475, the second virtual address space may be deleted. For example, deletion may include deletion of the page table instance associated with the second VAS.

Figure 5:
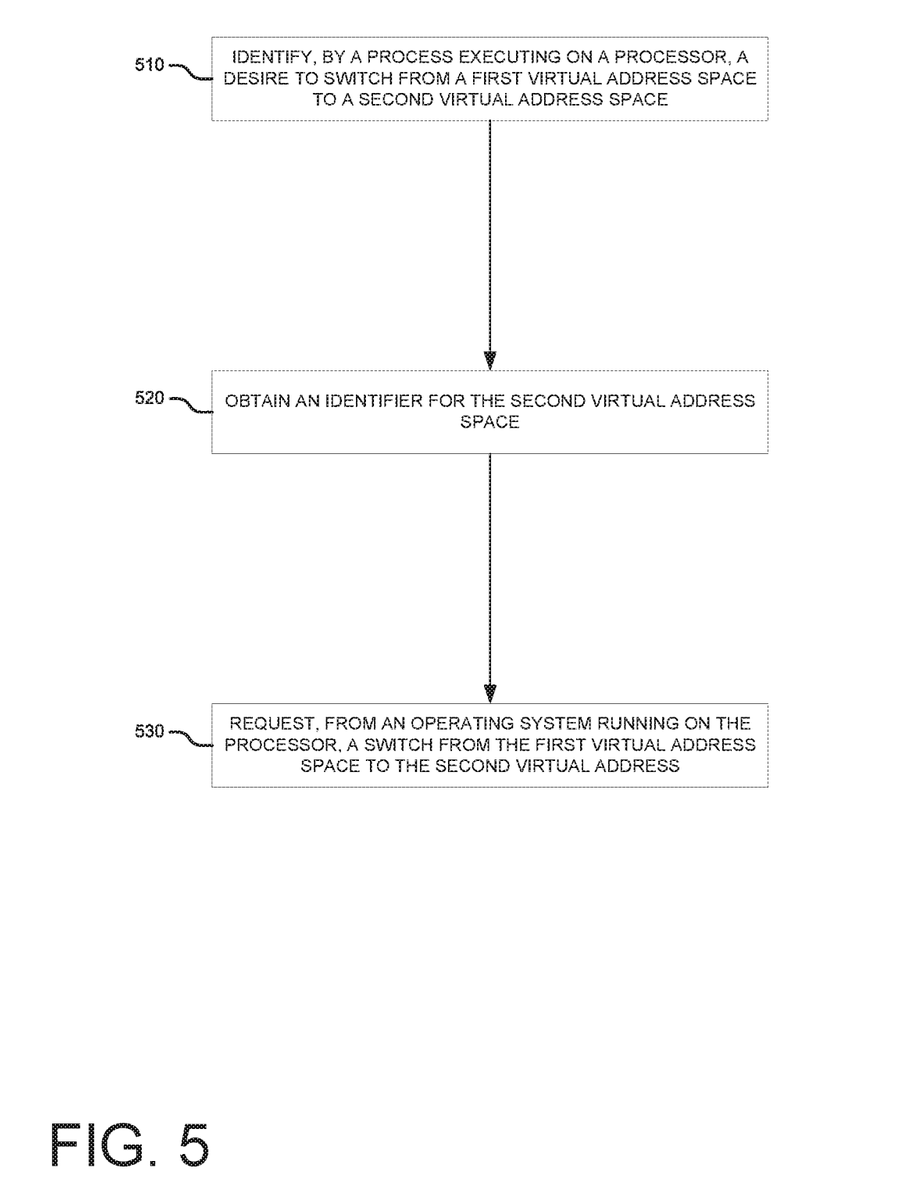
FIG. 5 is an example of a high level flow diagram of a process switching virtual address spaces according to techniques described herein.

FIG. 5 is an example of a high level flow diagram of a process switching virtual address spaces according to techniques described herein. In block 510, a process executing on a processor may identify a desire to switch from a first virtual address space to a second virtual address space. As mentioned above, the process may determine the desire to switch to a different VAS in order to access memory beyond that which is available in a single VAS or the process may wish to access data contained in a different VAS. Regardless of the reason for switching, the process may identify the desire to switch virtual address spaces.

In block 520 an identifier for the second virtual address space may be obtained. In order to switch to a different VAS, an identifier associated with the second VAS may be used to particularly identify the address space to which the process will switch. In block 530, a process may request, from an operating system running on the processor, a switch from the first virtual address space to the second virtual address space. As mentioned above, the process need not be aware of the particular detail involved in switching from one address space to another. The process may simply identify the VAS to switch to (e.g. using the identifier) and then request the operating system to switch the process from the first VAS to the second VAS. The particular details of the switching process may be transparent to the process itself.

Figure 6:
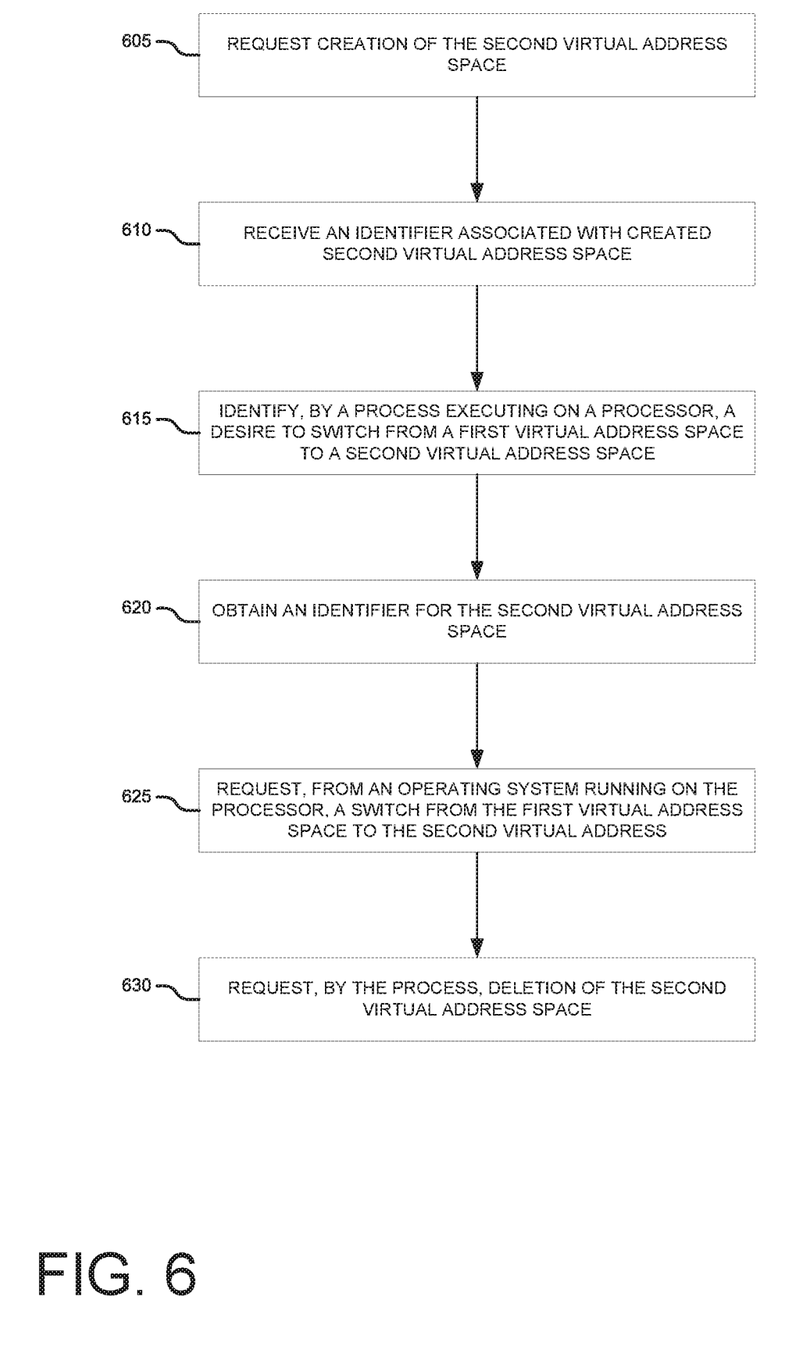
FIG. 6 is another example of a high level flow diagram of a process switching virtual address spaces according to techniques described herein.

FIG. 6 is another example of a high level flow diagram of a process switching virtual address spaces according to techniques described herein. In block 605, creation of the second virtual address space may be requested. As explained above, a VAS is now treated as a first class entity, and as such, can be created independent of any process. Thus, the techniques described provide for the ability to request creation of a new VAS.

In block 610, an identifier associated with the created second virtual address space may be received. As mentioned above, a VAS may be identified through the identifier. The identifier may be created as part of the creation of a VAS. The identifier may then be sent to the process that requested creation of the second VAS, such that process is able to identify the created second VAS.

In block 615, a process executing on a processor, may identify a desire to switch from a first virtual address space to a second virtual address space. As mentioned above, the desire may stem from a desire to access memory beyond that which is accessible in a single VAS or it may stem from a desire to access data that is stored in a different VAS.

In block 620, an identifier for the second VAS may be obtained. For example, the identifier may be the identifier that was received in block 610 in the case that the VAS has been newly created. The identifier may be associated with a VAS that was previously created. Regardless of when created, the identifier may identify the VAS to which the process will switch.

In block 625, the process may request from an operating system running on the processor a switch from the first virtual address space to the second virtual address space.

In block 630, the process may request deletion of the second virtual address space. As mentioned above, the VAS is treated as a first class entity meaning that it can be created independently of a process. In addition, a VAS can be deleted independent of a process being destroyed. As such, when a VAS is no longer needed, deletion of the VAS may be requested, thus freeing up any resources being used to maintain the VAS to be deleted. As explained above, such resources may include page table structures or storage space used to store the data contained in page table structures.

Figure 7:
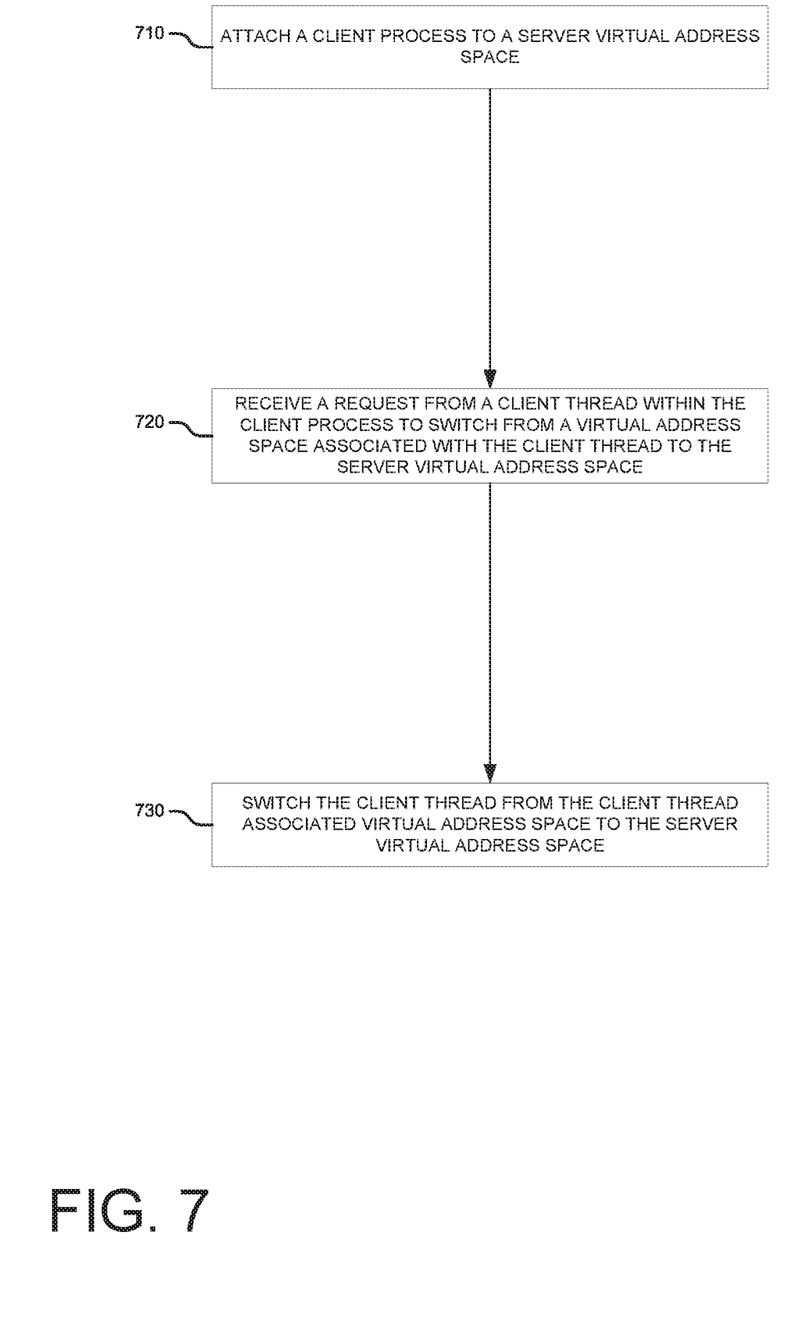
FIG. 7 is an example of a high level flow diagram for switching from a client to a server virtual address space, according to techniques described herein.

FIG. 7 is an example of a high level flow diagram for switching from a client to a server VAS, according to techniques described herein. The flow diagram depicted in FIG. 7 may be implemented as computer executable instructions that may be executed by a processor. For example, the instructions may be included in a non-transitory processor readable medium 140 described above. In block 710, a client process may attach to a server virtual address space. As mentioned above, attaching a client process to a virtual address space allows threads within the client process to switch into a different virtual address space, and then be able to switch back into their original virtual address space. Attaching a client process to a virtual address space may include copying portions of a thread's context, such as the thread's stack and local variables, as well as portions of the thread's executable code to the virtual address space that is being attached. Doing so allows a thread to continue execution when entering the new virtual address space and also allows the thread to continue operation when switching back out of the virtual address space.

In block 720, a request may be received from a client thread within the client process to switch from a virtual address space associated with the client thread to a server virtual address space. By switching into the server VAS, the client thread may gain access to data and methods that are only available when in the server VAS. For example, the server VAS may include executable code that is executable only when the client thread is switched to the server VAS. As such, the client thread is able to execute as if it were the server, while at the same time avoiding the difficulties associated with client server programming that were described above.

In block 730, the client thread may switch from the client thread associated virtual address space to the server virtual address space. As described above, the switch may include modifying thread state information to reflect the change from the client thread VAS to the server VAS. The process of switching a process or thread from one VAS to another VAS was described above, in particular with respect to FIG. 4.

Figure 8:
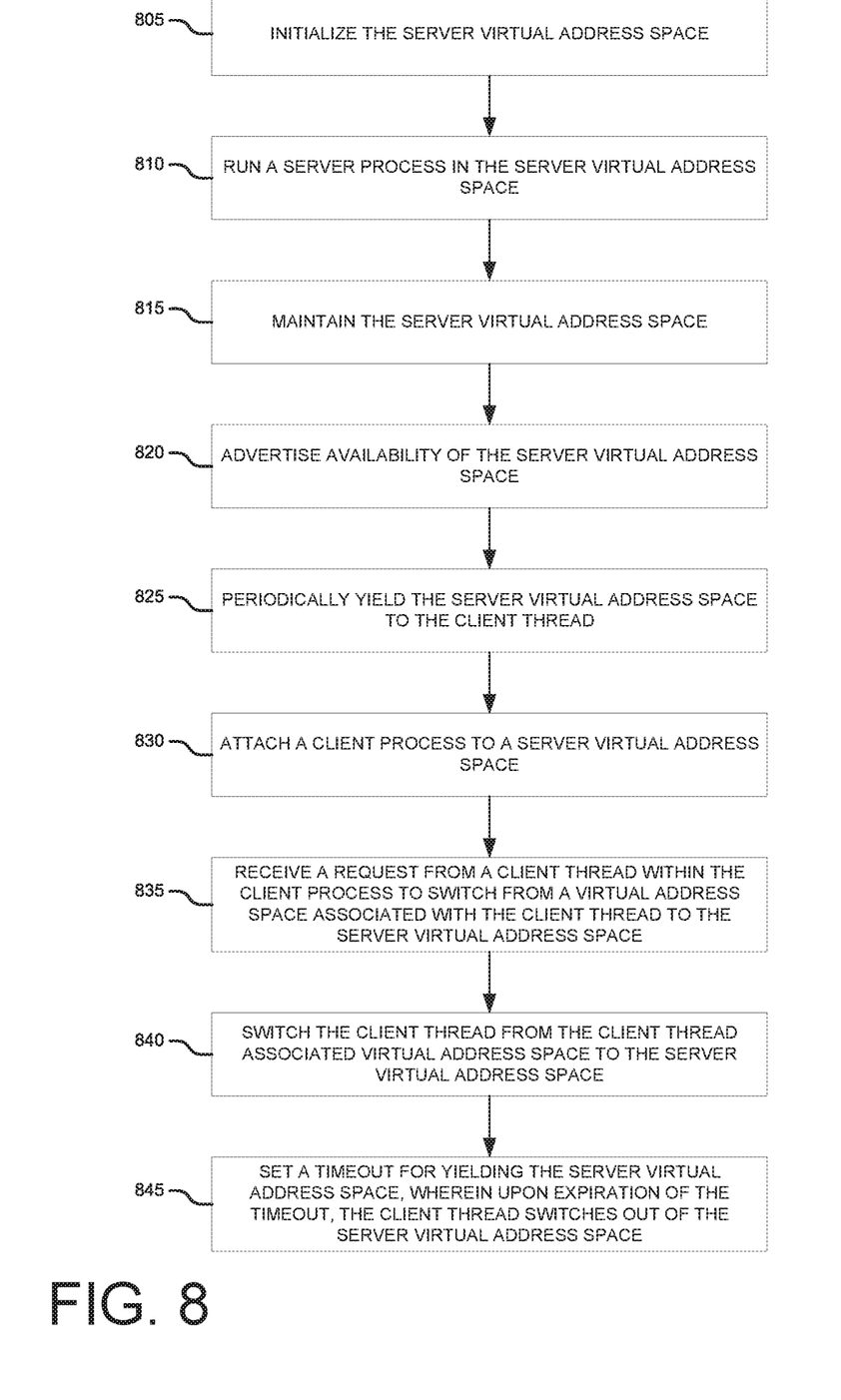
FIG. 8 is another example of a high level flow diagram for switching from a client to a server virtual address space, according to techniques described herein.

FIG. 8 is another example of a high level flow diagram for switching from a client to a server virtual address space, according to techniques described herein. The flow diagram depicted in FIG. 8 may be implemented as computer executable instructions that may be executed by a processor. For example, the instructions may be included in a non-transitory processor readable medium 140 described above. In block 805, a server virtual address space may be initialized. As explained above, a VAS is a first class entity in the techniques described herein. Thus, a server VAS may be created independently of an actual server process. However, it should be understood that this characteristic is not required. A server process associated with the server VAS may also exist.

In block 810, a server process may run in the server virtual address space. The server process may be responsible for the server VAS. For example, in block 815, the server process may maintain the server virtual address space. Maintenance can include any type of activity that would normally be associated with a server process. For example, maintenance can include garbage collection within the server VAS. Other maintenance tasks may include check-pointing, replication, or other functions that may be performed by a server process. For example, the tasks may be operations and/or computations that would be performed by a server process during quiescent periods of access.

In block 820, the availability of the server virtual address space may be advertised. As explained above, a thread of a client process may desire to switch into the server VAS. However, a prerequisite to the switch would be the process knowing of the existence of the server VAS so that the process can attach to the server VAS. The particular mechanism used for advertising the availability of the server VAS is relatively unimportant. What should be understood is that processes wishing to attach to the server VAS (such that threads within the process wishing to switch into the server VAS) may be made aware of the existence of the server VAS.

In block 825, the server virtual address space may be periodically yielded to the client thread. In other words, the server process may periodically yield control of the server VAS, such that threads of another process may switch into the server VAS. In some implementations, threads may be prohibited from switching into the server VAS during periods of time that the server process has not yielded the server VAS.

In block 830, a client process may attach to a server virtual address space. As mentioned above, attaching to a server VAS allows threads of the client process to seamlessly switch into the server VAS to execute functionality provided by the server. The attachment also allows the client threads to seamlessly switch back to the client thread virtual address space, to resume executing functionality provided by the client.

In block 835, a request may be received from a client thread to switch from a virtual address space associated with the client thread to a server virtual address space. For example, a client thread may wish to access data or functionality that is only available within the server VAS. The client thread may request a switch into the server VAS in order to gain access to that data and/or functionality. By limiting the access to the data and/or functionality to threads executing in the server VAS only, the server data can be protected from client threads inappropriately accessing the data and/or functionality of the server without meaningful controls on what the thread is able to do.

In block 840, the client thread may switch from the client thread associated virtual address space to the server virtual address space. When the switch occurs, the client thread is then able to access data and/or functionality contained within the server VAS. As explained above, the client thread may access the data directly, without having to incur the overhead that would come from messaging between client and server processes. The client thread can simply access the server VAS as if it were the clients own virtual address space. However, the server VAS may place constraints on what client threads that have switched into the server virtual address space can do. For example, the server VAS may ensure that client threads do not modify data in the server VAS in ways that could corrupt the data or lead to inconsistencies in the data contained in the server VAS.

In block 845, a timeout may be set for yielding the server virtual address space. For example, the timeout may have been set as part of the yielding process described above with respect to block 825. However, the timeout may also be set in other ways, such as a signal delivered to the thread currently in the server VAS. Upon expiration of the timeout, the client thread may switch out of the server VAS. In some example implementations, the server process may wait until all client threads have switched out of the server VAS before switching back into the server VAS. In other example implementations, the server process may preempt the client threads, and force the client threads to switch out of the server VAS.

The server process is thus able to continue to maintain the server VAS even during periods of time when client threads wish to use the server VAS. In other words, the client threads are not able to starve the server process from access to the server VAS.

It should be noted that the server VAS may be associated with multiple page table instances, with each page table instance having different access privileges. The access privileges may determine the capabilities of the client threads when in the server VAS. For example, there may be multiple page table instances that include the same portion of a server VAS. However, in one page table instance, a portion of the VAS may be marked as read only, while in the other page table instance, the portion may be marked as read/write. Thus, the capabilities of the client thread when switched into the server VAS may be dependent on the particular page table instance selected.

Figure 9:
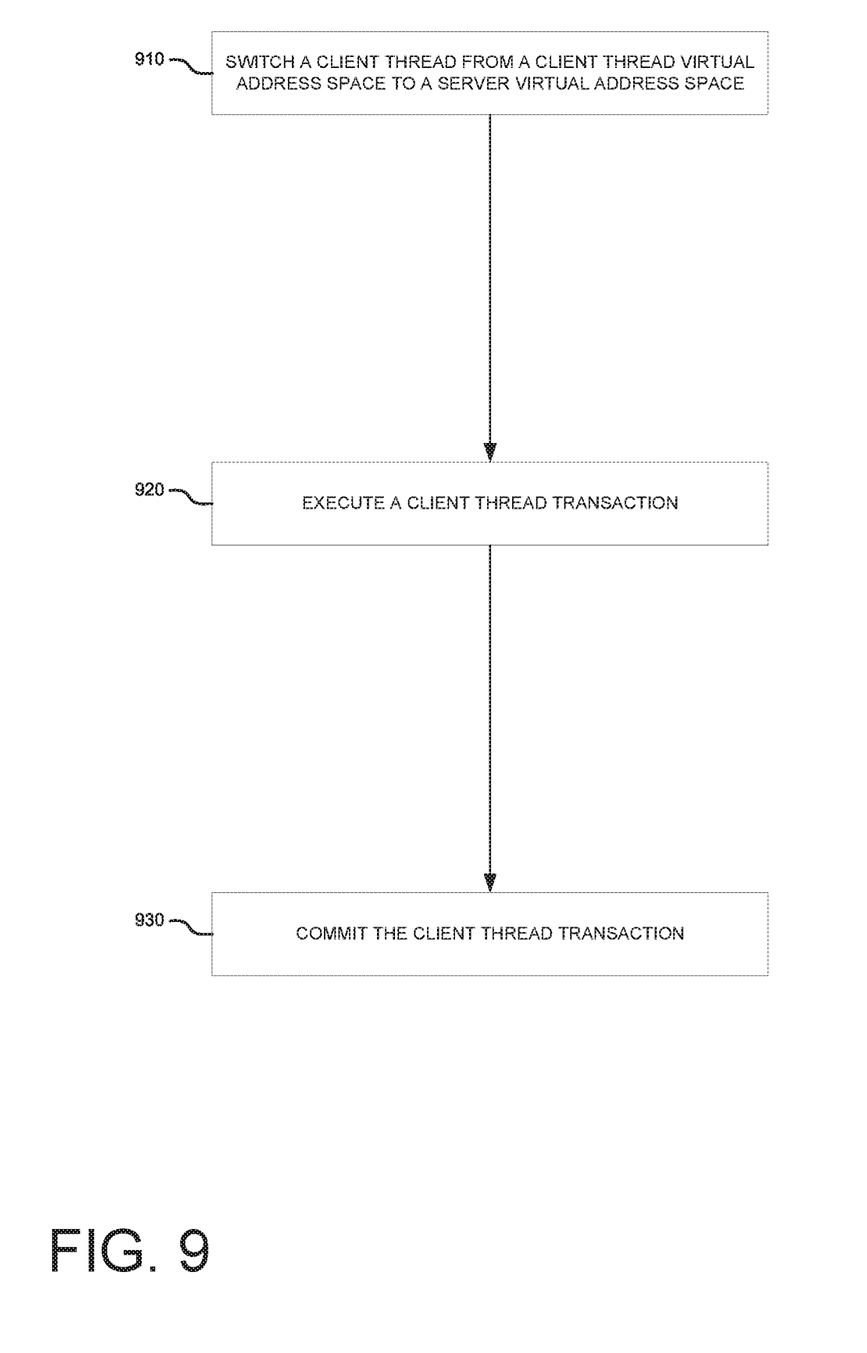
FIG. 9 is an example of a high level flow diagram for executing a transaction in a server virtual address space according to techniques described herein.

FIG. 9 is an example of a high level flow diagram for executing a transaction in a server virtual address space according to techniques described herein. In block 910, a client thread may switch from a client virtual address space to a server virtual address space. As discussed above, the techniques described herein allow for a client thread to switch from one VAS to a different VAS, once the client process associated with the client thread has attached to the different VAS. In some examples, the first VAS may be that of a client thread. The second VAS may be that of a server process. The client thread may then access functionality that would normally only be available to the server process, without incurring the overhead present in a message based client server system.

In block 920, the client thread may execute a transaction. For example, in the case where the server process represents a database, the client thread may execute a transaction from within the server VAS. For example, the transaction may be a read transaction, a write transaction, or a combination of a read and a write transaction. The client thread may execute instructions to perform the transaction, and those instructions may only be executable while the client thread is in the server VAS. In addition to instructions to perform the transaction, the instructions may also include functionality to ensure the integrity of the server VAS.

In block 930, the client thread transaction may be committed. It should be understood that even though the client thread is executing within the server's VAS, the normal processing that would occur in a message passing based client server system would still exist. For example, in the case of a message passing client server based system, a transaction is not considered persistent in the server until it is committed. Likewise, a transaction that occurs in a VAS may not be considered persistent until the transaction is committed in the server VAS. Just as in a message passing based client server system, if a transaction fails, the transaction can be rolled back. A transaction may not be considered successful until the commit operation is complete.

Figure 10:
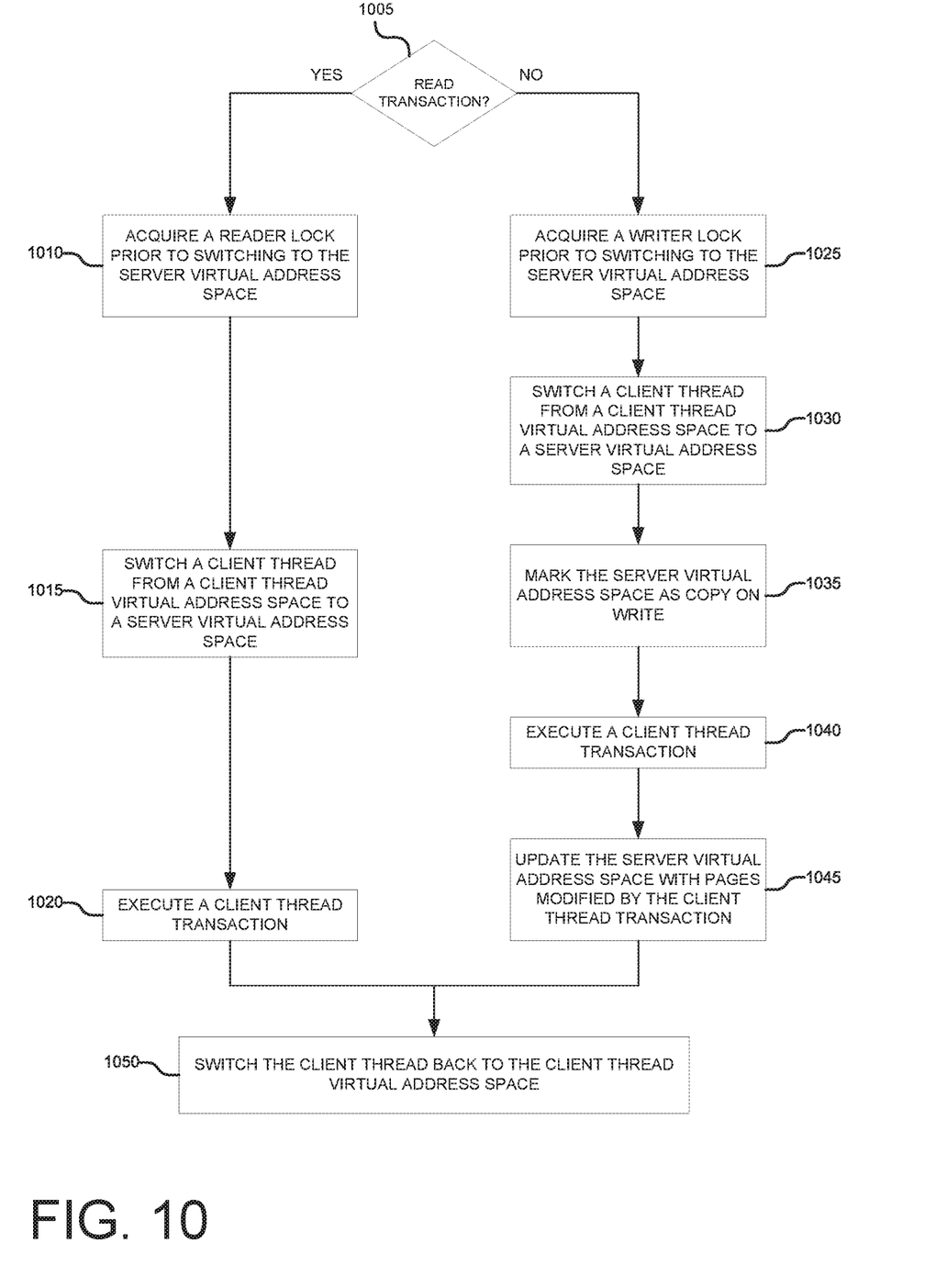
FIG. 10 is another example of a high level flow diagram for executing a transaction in a server virtual address space according to techniques described herein.

FIG. 10 is another example of a high level flow diagram for executing a transaction in a server virtual address space according to techniques described herein. In block 1005, it may be determined if a transaction is a read transaction. If so, the process moves to block 1010.

In block 1010, a reader lock may be acquired prior to switching to the server virtual address space. By acquiring a reader lock prior to switching to the server VAS, it can be ensured that the thread will have possession of a reader lock before incurring the VAS switch overhead. If a reader lock cannot be acquired, the thread is not allowed to switch to the server VAS.

In block 1015, a client thread may switch from the client thread virtual address space to a server virtual address space. The mechanism for switching from one VAS to a different VAS is described above. It should be understood that the step of attaching the client process to the server VAS is assumed to have already occurred. At this point, the client thread has switched to the server VAS and is also holding a reader lock, which allows the client thread to execute a read transaction.

In block 1020, a client thread transaction may be executed. The transaction may be a read transaction, as was determined in block 1005. It should be understood that in some implementations, multiple client threads may be allowed to switch into the server VAS at the same time, so long as all client threads are readers. This is acceptable because a reader only client thread would not be altering any data in the server VAS that would adversely impact other reader client threads.

If it is determined in block 1005 that the transaction is not a read transaction, the process moves to block 1025. In block 1025, a writer lock may be acquired prior to switching into the server virtual address space. As described above with respect to block 1010, obtaining a writer lock prior to switching into the server virtual address space ensures that the client thread will be able to write to the server VAS.

In block 1030, the client thread may switch from a client thread virtual address space to a server virtual address space. In one implementation, in block 1035 the server virtual address space may be marked as copy on write. What this means is that the client thread may access the server VAS, but upon modification of any data in the server VAS, a copy of those pages being modified is made. Thus, the modifications are not immediately available within the server VAS.

In block 1040, a client thread transaction may be executed. Based on the determination in block 1005, the client thread transaction may be a write transaction. If the server VAS was set to be copy on write, then any modifications made by the client thread transaction will cause copies of pages modified by the transaction to be made.

In block 1045, the server virtual address space may be updated with pages modified by the client thread transaction. In other words, the transaction may be committed, and all modifications are now visible to any thread that switches into the server VAS.

In block 1050, regardless of if the transaction is a read or write transaction, the thread may switch back to the client thread virtual address space.

We claim:

1. A non-transitory processor readable medium containing thereon a set of instructions which when executed by a processor cause the processor to:
    attach a client process associated with a client virtual address space to a server virtual address space;
    receive, from a client thread within the client process, a request to switch from the client virtual address space to the server virtual address space;
    acquire a writer lock;
    switch the client thread from the client virtual address space to the server virtual address space, wherein the server virtual address space is marked as copy on write, and
    wherein the server virtual address space is associated with multiple page table instances, each page table instance having different access privileges, the access privileges determining the capabilities of the client thread when in the server virtual address space;
    execute a client thread transaction;
    commit the client thread transaction; and
    update the server virtual address space with pages modified by the client thread transaction.

2. The medium of claim 1 wherein the server virtual address space includes executable code that is executable only when the client thread is switched to the server virtual address space.

3. The medium of claim 1 further comprising instructions to:
    initialize the server virtual address space; and
    advertise availability of the server virtual address space.

4. The medium of claim 3 further comprising instructions to:
    run a server process in the server virtual address space; and
    periodically yield, by the server process, the server virtual address space to one or more client threads within the client process.

5. The medium of claim 4 further comprising instructions to:
    set a timeout for yielding the server virtual address space, wherein upon expiration of the timeout, the client thread switches out of the server virtual address space.

6. The medium of claim 5 wherein the server process preempts the client thread.

7. The medium of claim 6 wherein the server virtual address space further includes instructions to:
    maintain the server virtual address space.

8. The non-transitory processor readable medium of claim 1, wherein the client virtual address space is a first class entity decoupled from the client process.

9. The non-transitory processor readable medium of claim 1, wherein the client process is a first client process, the medium further comprising instructions which when executed by the processor cause the processor to:
    terminate the first client process, wherein the client virtual address space continues to exist independently of the termination of the first client process; and
    attach a second client process to the client virtual address space.

10. The non-transitory processor readable medium of claim 9, wherein the client thread is a first client thread, and wherein, to attach the second client process to the client virtual address space, the medium further comprises instructions which when executed by the processor cause the processor to:
    copy at least a portion of a context of a second client thread of the second client process to the second virtual address space, the copied at least a portion of the context of the second client thread comprising at least one of a stack of the second client thread, one or more local variables of the second client thread, or executable code of the second client thread.

11. A method comprising:
    acquiring a writer lock prior to switching a client thread from a client thread virtual address space to a server virtual address space;
    marking the server virtual address space as copy on write;
    switching the client thread from the client thread virtual address space to the server virtual address space;
    executing a client thread transaction;
    committing the client thread transaction; and
    updating the server virtual address space with pages modified by the client thread transaction.

12. The method of claim 11 further comprising:
switching the client thread back to the client thread virtual address space.

13. The method of claim 11 further comprising:
acquiring a reader lock prior to switching to the server virtual address space.

14. The method of claim 11 further comprising:
determining permissions of the client thread when switching into the server virtual address space.

15. A device comprising:
a processor to address physical memory;
an operating system running on the processor and supporting a virtual memory system, wherein a client process is attached to a server virtual address space of the virtual memory system; and
the physical memory storing instructions executable by the processor to:
  initialize the server virtual address space;
  acquire a writer lock;
  switch a client thread within the client process from a client virtual address space associated with the client thread to the initialized server virtual address space, wherein the server virtual address space is marked as copy on write, and
wherein the server virtual address space is associated with multiple page table instances, each page table instance having different access privileges, the access privileges determining the capabilities of the client thread when in the server virtual address space;
  execute a client thread transaction;
  commit the client thread transaction; and
  update the server virtual address space with pages modified by the client thread transaction.

16. The device of claim 15, wherein the client virtual address space is a first class entity decoupled from the client process.

17. The device of claim 15, wherein the client process is a first client process, the physical memory further storing instructions executable by the processor to:
  terminate the first client process, wherein the client virtual address space continues to exist independently of the termination of the first client process; and
  attach a second client process to the client virtual address space.

18. The device of claim 17, wherein the client thread is a first client thread, and wherein, to attach the second client process to the client virtual address space, the physical memory further stores instructions executable by the processor to:
  copy at least a portion of a context of a second client thread of the second client process to the second virtual address space, the copied at least a portion of the context of the second client thread comprising at least one of a stack of the second client thread, one or more local variables of the second client thread, or executable code of the second client thread.

* * * * *